US006306493B1

(12) United States Patent
Brownfield

(10) Patent No.: US 6,306,493 B1
(45) Date of Patent: Oct. 23, 2001

(54) LASER-MARKABLE PAPER AND BOARD PRODUCTS

(75) Inventor: Alexandra Brownfield, San Clemente, CA (US)

(73) Assignee: Merck Patent Gesellschaft (DE)

( * ) Notice: Subject to any disclaimer, the term of this patent is extended or adjusted under 35 U.S.C. 154(b) by 0 days.

(21) Appl. No.: 09/124,848

(22) Filed: Jul. 30, 1998

(30) Foreign Application Priority Data

Jul. 30, 1997 (DE) .............................................. 197 32 860

(51) Int. Cl.[7] .............................................. B32B 5/16

(52) U.S. Cl. .............................. 428/327; 428/480; 428/500; 162/157.2; 162/162; 162/164.1; 162/164.7; 162/185

(58) Field of Search .............................. 162/157.1, 157.2, 162/158, 162, 164.1, 164.7, 183–185, 138; 428/323, 327, 411.1, 480, 500; 427/180, 195, 146; 430/945

(56) References Cited

U.S. PATENT DOCUMENTS 3,607,375 * 9/1971 Wiejak .............................. 117/138.8 UA

FOREIGN PATENT DOCUMENTS

362248682A * 10/1987 (JP) .
403186855A * 8/1991 (JP) .

* cited by examiner

*Primary Examiner*—Paul Thibodeau
*Assistant Examiner*—Christopher G. Paulraj
(74) *Attorney, Agent, or Firm*—Millen, White, Zelano & Branigan, P.C.

(57) ABSTRACT

There is provided laser-markable paper and board products which include micronized polymers comprising of linear aromatic polyesters and/or of linear polyarylenes having a particle size of from 0.1 to 100 μm as absorber material and material for carbonization.

12 Claims, No Drawings

LASER-MARKABLE PAPER AND BOARD PRODUCTS

BACKGROUND OF THE INVENTION

1. Field of the Invention

The present invention relates to laser-markable paper and board products which include micronized polymers as absorber material and material for carbonization.

2. Description of the Background Art

The placing of distinguishing marks on products is becoming increasingly important in almost all sectors of industry. For example, it is frequently necessary to apply production dates, expiry dates, bar codes, company logos, serial numbers, etc. At the present, these markings are predominantly executed using conventional techniques, such as printing, embossing, stamping and labeling. However, the importance of non-contact, high-speed and flexible marking using lasers is increasing. This laser marking technique makes it possible to apply graphic inscriptions, for example bar codes, at high speed even to a non-planar surface.

In printed products for the packaging sector (folding cartons, labels, etc.), there has been an increased requirement that direct laser marking, coding and inscription of the paper and board products be made possible, without the printing-on of additional fields.

SUMMARY OF THE INVENTION

It is therefore an object of the present invention to provide laser-markable paper products which, when treated with laser light, make it possible to achieve a marking which has good legibility and crisp edges.

Upon further study of the specification and appended claims, further objects and advantages of this invention will become apparent to those skilled in the art.

Ordinarily, paper is difficult or impossible to mark with a laser, because its layer thickness is low. To make the paper capable of laser inscription, it is necessary to incorporate appropriate absorbers which carbonize at high temperatures into the paper. The absorber material should have a very pale neutral intrinsic color, and/or have the properties of the paper product to be marked, and at the same time required to be only in small amounts.

Surprisingly, it has now been determined that if micronized polymers composed of linear aromatic polyesters and/or of linear polyarylenes having a particle size of from 0.1 to 100 μm are incorporated as absorber material directly into the body and/or coating of the paper, the markings obtained on paper and board products would have high contrast, crisp edges and good legibility.

In view of the above, a preferred embodiment of the invention, therefore, provides laser-markable paper and board products which include micronized polymers composed of linear aromatic polyesters and/or of linear polyarylenes having a particle size of from 0.1 to 100 μm as absorber material and material for carbonization.

In a further preferred embodiment, adding the micronized polymers in concentrations of from 0.1 to 10% by weight based on the body of the paper, preferably from 1 to 5% by weight and in particular from 1 to 2% by weight, achieves high contrast in the laser marking. However, the concentration of the absorber in the body of the paper depends on the type of body of the paper and on the thickness of the paper and the energy density of the laser used. The relatively low proportion of absorber material neither alters the paper product significantly nor has any effect on its processability.

DETAILED DESCRIPTION OF THE PREFERRED EMBODIMENTS

The crispness of the edges of the marking is determined in particular by the particle size of the micronized polymers applied to paper products. The polymers preferably have particle sizes in the range from 0.1 to 50 μm, in particular from 0.1 to 15 μm. Suitable absorber materials are, in particular, from the class of linear aromatic polyesters, the polycarbonates (PC), polyalkylene terephthalates (PTP), the poly(ether)esters and polyarylates. Particularly preferable polymers from the class of linear polyarylenes are the polyphenylene ethers (PPO and PPE), polyaryl ether ketones (PEK and PEEK), polyanilines, polyphenylene sulfides (PPS) and polysulfones (PSU, PES and PPSU).

It is also possible to use a combination of a mixture of different micronized polymers in any of the possible mixing ratios as absorber material and material for carbonization.

During the marking, the absorption achieved must not be so strong that the paper bums through leaving a black speck and/or a hole on the paper. The absorption of the laser radiation and the interaction with the absorber depends on many factors, inter alia, on the paper used. On the absorber and on the laser wavelength used. High-energy radiation is preferably used for the marking, generally in the wavelength range from 150 to 1500 nm, preferably from 150 to 1100 nm.

Example of the types of lasers used are $CO_2$ lasers (10,600 nm, Nd:YAG lasers (1067 or 532 nm) and pulsed UV lasers (excimer lasers).

The use of Nd:YAG lasers (1064 or 532 nm) or $CO_2$ lasers (10,600 nm) is particularly preferred. The energy densities of the lasers used are generally in the range from 0.3 $mJ/cm^2$ to 50 $J/cm^2$, preferably from 0.5 $mJ/cm^2$ to 20 $J/cm^2$ and particularly preferably from 0.3 $mJ/cm^2$ to 10 $J/cm^2$.

When pulsed lasers are used, the pulse frequency is generally in the range from 0.1 to 10,000 Hz, preferably from 0.5 to 5000 Hz and in particular from 1 to 1000 Hz, and the pulse lengths (duration of the individual pulse) are in the range from 0.1 to 1000 ns, preferably from 0.1 to 500 ns and particularly preferably from 1 to 100 ns.

Depending on the energy density of the laser used and on the pulse lengths and the type of paper product irradiated, the number of pulses required to achieve good inscriptions is generally from 1 to 20,000, preferably from 1 to 5000 and in particular from 1 to 3000.

With the aid of a laser, the novel process of laser marking for producing inscriptions with crisp edges and high contrast on any laser-markable paper or board product is possible. The inscription with the laser is brought about by placing the specimen in the path of a laser beam, preferably of a $CO_2$ or Nd:YAG laser. Inscription with an excimer laser is also possible. However, the desired results may also be achieved with other conventional types of laser which have a wavelength in the high absorption range of the absorber used. The shade and depth of color obtained are determined by the laser parameters, such as the time and power of irradiation. The power of the laser used depends on the individual application, and can easily be determined in a given case by the person skilled in the art.

Paper and board products, in particular for the packaging market sector, are generally composed of from 70 to 100% of natural and synthetic fibers, and from 20 to 30% of fillers and sizes, which form the middle layer of the paper and board products. These are useful for the invention.

A coating composition consisting of pigments for white coloration, binders and additives can be applied in one to three uniform applications onto raw paper to achieve a sealed, smooth surface for the printing and further processing. The coated papers are calendered matt or gloss and are produced coated on one or both sides.

The paddle stirrers and shapes of vessels used in the paper industry are suitable for incorporating the absorber materials into the body of the paper. The absorber material can be stirred in during the production of the paper stock at any stage of the paper making process before the paper machine is fed, or the absorber material may also be introduced into the coating composition.

Paper generally consists of mechanical and/or chemical pulp and, if desired, synthetic fibers and auxiliaries, such as fillers, binders for sizing, retention aids, optical brighteners and dyes. The absorber can be incorporated into the body of the paper in various ways. The absorber material can, for example, be mixed with the chemical and/or mechanical pulp in dry form. Alternatively, the absorber can be admixed with fibrous stock made from chemical and/or mechanical pulp. A homogeneous distribution of the absorber material is likewise achieved if the absorber material is added to the individual components of the papermaking auxiliary. It is particularly preferably to add the absorber material to the binder necessary for sizing the paper. However, it is also possible to delay adding the absorber material until the fibrous stock is mixed with the papermaking auxiliaries. The finished paper stock then goes to a paper-making machine.

The raw paper with the absorber is generally coated one or more times on one or both sides. It is likewise possible to stir the absorber material into the coating material. However, if this is done, the total proportion of the absorber material in the raw paper and in the coating should not exceed the upper limit of 10% by weight, based on the body of the paper, otherwise the marking may not have crisp edges. The absorber material may also be incorporated into the paper or board product by coating the raw paper without absorber material, using a coating composition with absorber material. In this case, the absorber is present only in the coating material and not in the actual body of the paper.

The fibrous materials used, besides mechanical and chemical pulp, are particularly modified mechanical pulps, such as thermomechanical pulp and chem-thermo-mechanical pulp and/or mixtures of these types of pulp. It is furthermore also possible to use reclaimed chemical pulp from used paper. The marking result is favorably affected if the fibers mentioned contain a proportion of man-made fibers, in particular cellulose derivatives, cellulose ethers, cellulose acetate, viscose fibers and carbon fibers, polyethylene and polypropylene, polyvinyl alcohol, acrylonitrile (co)polymers and polyamides, e.g., heat resistant aramid fibers. Additives of this type have a favorable effect on the crispness of the edges and the depth of color of the marking.

To improve smoothness, printability and opacity of the paper, fillers, such as $CaCO_3$, $BaSO_4$, $Al(OH)_3$, $CaSO_4$, ZnS, $SiO_2$, chalk, $TiO_2$ and kaolin are added to the fibrous starting materials. These fillers are also used as coating pigments for improving surface quality in coating compositions or cast coatings.

Another important constituent of the papermaking auxiliaries are the binders, such as starch, casein, proteins, plastics dispersions, resin sizes, etc., for strengthening the fiber structure, binding fillers and pigments, increasing water-resistance and improving inscribability and printability.

The selection of a suitable organic binder can favorably affect the marking result. Particularly good marking results are obtained if the binder is mixed with the absorber material and this mixture is mixed with mechanical and/or chemical pulp, in solid or liquid form.

Binders which are particularly suitable are solvent-free sizes which are also used in paper coating, coating and impregnation. Preferred binders are cationic resin sizes, colophonium, modified colophonium esters, synthetic alkyldiketenes and alkyl diacrylates. Other useful binders are vinyl-acetate-based and acrylate-resin-based plastics dispersions. In particular, water-soluble dispersions of polyvinyl alcohol, polyvinyl methyl ether, polyacrylic acid salts and copolymers, polyvinyl pyrrolidone and water-soluble cellulose ethers favorably affect the marking result of laser treatment.

In the case of coated paper, the raw paper is preferably coated with binders from the range of copolymers of styrene and butadiene. The above mentioned binders may likewise be used in the finishing of the paper.

The combination of the absorber material with the binders mentioned gives a synergistic effect and improves the marking result by making the markings darker and giving them crisper edges.

The retention aids used during papermaking to retain fines and fillers are, in particular, aluminum sulfate and synthetic cationic compounds, such as ethyleneimine polymers.

It is advisable to use dispersants, since the inorganic, absorber should be distributed very homogeneously in the body of the paper so that a uniform and clear marking can be achieved. Examples of suitable dispersants are Byk 410 (Byk-Chemie), Laponite RD/RDS (Laporte), Calgon neu (BK Ladenburg) and Polysalz SK (BASF).

Depending on the grade of paper in the body of the paper, optical brighteners are frequently added to increase whiteness.

Besides dyes and pigments for coloring the body of the paper or in coating compositions, for coloration of the surface in a preferred embodiment, the paper may also contain flame retardants and/or light-sensitive pigments. Particular examples are the oxides, hydroxides, sulfides, sulfates and phosphates of copper, bismuth, tin, zinc, silver, antimony, manganese, iron, nickel and chromium. The use of copper phosphate, in particular a copper(II)(hydroxide phosphate, is also preferable, particularly the compound which has the stoichiometric chemical formula $4CuO.P_2O_5.H_2O$ or $Cu_3(PO_4)_2.Cu(OH_2)$ and is obtained by heating blue Cu(II) orthophosphate ($Cu_3(PO_4)_2.3H_2O$) to from 100 to 200° C. Other suitable copper phosphates are $6CuO.P_2O_5.3H_2O$, $Cu_3(PO_4)_2.3Cu(OH)_2$, $5CuO.P_2O_5.3H_2O$, $Cu_3(PO_4)_2.2Cu(OH)_2.H_2O$, $4CuO.P_2O_5$, $4CuO.P_2O_5.3H_2O$, $4CuO.P_2O_5.1.5H_2O$ and $4CuO.P_2O_5.1.2H_2O$.

The proportion by weight of light-sensitive pigments in the body of the paper, combined with the absorber materials, preferably should not in total exceed 10% by weight, based on the body of the paper.

The mixing ratio of the light-sensitive pigments with the inorganic absorber material substrates is not subject to any particular limitation.

The light-sensitive pigments are preferably added together with the absorber, but in principle it is also possible to add them separately. It is also possible to add a mixture of different light-sensitive pigments to the paper stock.

Besides the usual papermaking auxiliaries (including those discussed above), it is also possible to add other additives not mentioned here to the paper stock.

The novel pigmented paper product may be used in any sector where paper has hitherto been inscribed using conventional ink-jet processes or laser-marking by removal of printing inks. Inscriptions and distinguishing marks can be made with the aid of laser light on, for example, labels, any type of paper packaging for household products and consumer goods, wrapping paper, cigarette packaging and cosmetics, even at positions which are difficult to access. Because of its low heavy metal content, the novel paper product can furthermore be used in packaging in the food and toy sectors. The markings on the packaging are notable for their wipe- and scratch-resistance and for their ability to be applied hygienically in the marking process.

Another important application sector for laser inscription is in graphic products which have a permanent and counterfeit-proof marking, while also meeting the high aesthetic demands for high-quality packaging printing.

In graphic design products, direct laser marking, coding and inscription of paper or board product is not possible without printing-on of additional fields (black and white areas) to see any contrast. According to the present invention, graphic products made of paper containing micronized polymer as an absorber material can be marked even at positions which are difficult to access.

Another application section is in securities and security papers.

The marked paper products and board products can moreover be subsequently printed and further processed, for example surface-coating, laminating or sealing, without adverse effect on their markability.

The examples below are intended to explain the invention but not to limit the same.

EXAMPLES

In the foregoing and the following examples, all temperatures are set forth uncorrected degrees in Celsius and unless otherwise indicated, all parts and percentages are by weight. Production of Paper With Label Paper Formulation

Example 1

Base paper having a weight per unit area of about 70 $g/m^2$ and comprised of:

Fiber: 100% of chemical pulp beaten to about 30° SR 7%, based on fiber, of calcium carbonate as filler in the paper 0.5% of colophonium (size)

0.1% of cationic polyethyleneimine (Polymin SK, BASF) as retained aid 1.5% of micronized polyphenylene sulfide (Hoechst)

The label paper produced in this way is inscribed using a laser. Marking with a YAG laser (1500 Hz, 19A, 20 mm/s) gives a dark marking with crisp edges and high contrast.

Example 2

Base paper having a weight per unit area of about 70 $g/m^2$ and comprised of:

Fiber: 100% of chemical pulp beaten to about 30° SR 7%, based on fiber, of $TiO_2$ as filler in the paper 0.5% of synthetic alkyldiketene (Aquapel 2B, Herkules Siegburg)

0. 1% of cationic polyethyleneimine 1.5% of micronized polycarbonate (Röhm)

The label paper is inscribed using a $CO_2$ laser (energy density—2 $J/cm^2$). The marking obtained is dark and has crisp edges.

Example 3

Base paper having a weight per unit area of about 70 $g/m^2$ and comprised of:

Fiber: 100% of CTMP beaten to about 30° SR

7%, based on fiber, of barium sulfate as filler in the paper 0.5% of colophonium 0.1% of cationic polyethyleneimine 2% of micronized polyether sulfone (BASF)

The label paper is inscribed using a YAG laser (1500 Hz, 19A, 20 mm/s). The marking is dark and has crisp edges and high contrast.

Example 4

Base paper having a weight per unit area of about 70 $g/m^2$ and comprised of:

Fiber: 100% of chemical pulp beaten to about 30° SR

7%, based on fiber, or barium sulfate as filler in the paper 0.5% of colophonium 0. 1% of cationic polyethyleneimine 2% of polyarylene ether ketone (Hoechst)

The label paper is inscribed using a YAG laser (1500 HZ, 19A, 30 mm/s). The marking is dark and has crisp edges and high contrast.

Example 5

Use of absorber material in the paper coating

Base paper having a weight per unit area of about 100 $g/m^2$ and comprised of:

Fiber: 100% of chemical pulp beaten to about 30° SR

7%, based on fiber, of calcium carbonate 0.5% of colophonium

01.% of cationic polyethyleneimine

Coated layer

Coating application: 20 $g/m^2$

| | |
|---|---|
| Filler: | calcium carbonate + kaolin |
| Binder: | 10%, based on filler, of styrene copolymers |
| Absorber: | 3%, based on filler, of polyphenylene sulfide |

Using a $CO_2$ laser (energy density—2 $J/cm^2$), the coated paper shows a dark marking and high contrast.

Example 6

Use of absorber material in the body of the paper and in the paper coating

Card base having a weight per unit area of about 200 $g/M^2$ and comprised of:

Fiber: 100% of chemical pulp beaten to about 30° SR

7%, based on fiber, of calcium carbonate 0.5% of colophonium 0.1% of cationic polyethyleneimine 2%, based on fiber, of polyethylene terephthalate (BASF)

Coated layer

Coating application: 20 $g/m^2$

| | |
|---|---|
| Filler: | calcium carbonate + kaolin |
| Binder: | 10%, based on filler, of styrene copolymers |
| Absorber: | 2%, based on filler, of polyphenylene terephthalate |

Using a $CO_2$ laser (energy density—2 $J/cm^2$), the coated paper shows a dark marking and high contrast.

Example 7

Base paper having a weight per unit area of about 70 $g/m^2$

Fiber: 100% of CTMP beaten to about 30° SR

8%, based on fiber, of calcium carbonate
0.5% of colophonium
0.1% of cationic polyethyleneimine
2%, based on fiber, of PET The label paper is inscribed using a YAG laser (1500 Hz, 19A, 20 min/s). The marking is dark and has crisp edges and high contrast.

Example 8

Base paper having a weight per unit area of about 70 $g/m^2$
Fiber: 100% of CTMP beaten to about 30° SR
8%, based on fiber, of calcium carbonate
0.5% of colophonium
0.1% of cationic polyethyleneimine
2% of polyphenylene ether (Huls)

Using a $CO_2$ laser (energy density—2 $J/cm^2$), the coated paper shows a dark marking and high contrast.

Example 9

Use of absorber material in the board and in the paper coating

Board having a weight per unit area of about 2 $g/m^2$ and comprising of:
65% of CTMP+35% of wood fiber (60% birch and 40% pine)
1.0% of colophonium
0.5% of cationic polyethylencimine
3.0%, based on fiber, of polyether sulfone
Coated layer
Coating application: 30 $g/m^2$ and 30 $g/m^2$

| | |
|---|---|
| Filler: | $TiO_2$ + kaolin |
| Binder: | styrene-butadiene dispersion |
| Absorber: | 2%, based on filler of polyarylene sulfone (BASF) |

Using a $CO_2$ laser (energy density—2 $J/cm^2$), the board shows a dark marking and high contrast.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding specific embodiments are, therefore, to be construed as merely illustrative, and not limitative of the remainder of the disclosure in any way whatsoever.

The full disclosure content of corresponding German application 197 32 860.1, is hereby incorporated into this application by reference.

While the invention has been particularly shown and described with reference to a preferred embodiment thereof, it will be understood by those skilled in the art that various changes in form and details may be made therein without departing from the spirit and scope of the invention.

What is claimed is:

1. A laser-markable paper or board product, comprising a linear polyarylene micronized polymer selected from polyphenylene ether, polyaryl ether ketone, polyaniline, polyphenylene sulfide or polysulfone, having a particle size of from 0.1 to 100 $\mu$m as absorber material and material for carbonization.

2. The laser-markable paper or board product according to claim 1, further comprising a linear aromatic polyester micronized polymer.

3. The laser-markable paper or board product according to claim 2, wherein said linear aromatic polyester micronized polymer is a polycarbonate, polyalkylene terephthalate, poly (ether)ester, or polyarylate.

4. The laser-markable paper or board product according to claim 1, wherein the amount of said micronized polymer is from 0.1 to 10% by weight of the paper or board product.

5. The laser-markable paper or board product according to claim 1, which further comprises a color pigment.

6. The laser-markable paper or board product according to claim 1, which further comprises a light-sensitive pigment.

7. The laser-markable paper or board product according to claim 1, further comprising a linear aromatic polyester micronized polymer which is mixed in the body of the paper or board product.

8. The laser-markable paper or board product according to claim 1, wherein the linear polyarylene micronized polymer is mixed in a coating material for coating the paper or board product.

9. The laser-markable paper or board product according to claim 1, wherein the linear polyarylene micronized polymer is mixed in paper stock.

10. A process for producing the laser-markable paper or board product of claim 1, comprising mixing the linear polyarylene micronized polymer with a paper stock during papermaking.

11. A process for producing the laser-markable paper or board product of claim 1, comprising mixing the linear polyarylene micronized polymer in a coating material for coating the paper or board product during papermaking.

12. A packaging, security paper or graphic product which comprises a laser-marked paper or board product prepared from a laser-markable paper or board product of claim 1.

* * * * *